United States Patent [19]
Cachera

[11] 4,372,911
[45] Feb. 8, 1983

[54] METHOD FOR FLATTENING THE CURVE OF EVOLUTION OF HEAT IN A FAST REACTOR CORE

[75] Inventor: Pierre C. Cachera, Saint-Germain en Laye, France

[73] Assignee: Electricite de France (Service National), Paris, France

[21] Appl. No.: 151,977

[22] Filed: May 21, 1980

Related U.S. Application Data

[63] Continuation-in-part of Ser. No. 843,652, Oct. 19, 1977, abandoned, which is a continuation-in-part of Ser. No. 656,603, Feb. 9, 1976, abandoned.

[30] Foreign Application Priority Data

Feb. 10, 1975 [FR] France ............................. 75 04112

[51] Int. Cl.³ .............................................. G21C 3/16
[52] U.S. Cl. ....................................... 376/349; 376/455
[58] Field of Search ....................... 176/73, 74, 68, 40, 176/83, 18, 50

[56] References Cited

U.S. PATENT DOCUMENTS

| | | | |
|---|---|---|---|
| 3,145,149 | 8/1964 | Imhoft .................................. | 176/83 |
| 3,446,703 | 5/1969 | Lyons et al. .......................... | 176/68 |
| 3,736,225 | 5/1973 | Barker et al. ......................... | 176/18 |
| 3,740,314 | 6/1973 | Neimark ............................... | 176/68 |
| 3,932,217 | 1/1976 | Cachera ................................ | 176/83 |

Primary Examiner—Harvey E. Behrend
Attorney, Agent, or Firm—Kerkam, Stowell, Kondracki & Clarke

[57] ABSTRACT

The core of a fast reactor having at least three core regions is made up of vertical fuel elements each having an axial passage of sufficient diameter to permit the flow of molten fissile material in the event of a power excursion. The diameter decreases from the central region of the core to the periphery, the decrease being proportional to the reduction in neutron flux density in order to maintain the integral of conductivity at a substantially constant value.

4 Claims, 4 Drawing Figures

METHOD FOR FLATTENING THE CURVE OF EVOLUTION OF HEAT IN A FAST REACTOR CORE

REFERENCE TO RELATED APPLICATIONS

This application is a continuation-in-part of application Ser. No. 843,652, filed Oct. 19, 1977, to be abandoned, the latter being a continuation-in-part of application Ser. No. 656,603, filed Feb. 9, 1976, now abandoned.

BACKGROUND OF THE INVENTION

This invention relates to a method for flattening the curve which is representative of the evolution of heat within a nuclear reactor core in the radial direction and in the axial direction of said core. The invention also relates to a nuclear reactor core for the application of said method.

In the more exact terms, the present invention is intended to ensure that the heat flux released by a nuclear reactor core in the radial directions and in its axial direction is made as uniform as possible.

In order to gain a clearer understanding of the problem, reference will be made to FIG. 1 of the accompanying drawings in which is shown diagrammatically the curve of distribution of neutron flux within a nuclear reactor core.

More precisely, said core is concerned with the case in which the enrichment of the fissile material constituting the reactor core is homogeneous.

In this figure, the neutron flux is plotted as ordinates along the axis Oy and the distance from the axis of the reactor core is plotted on the axis of abscissae Ox. It is considered in this figure that the reactor core has symmetry of revolution about its axis Oy. Said neutron flux is found to decrease substantially from the axis to the periphery of the reactor core. The zone a represents the fissile region of the core and the zone c represents the fertile blanket. As is already known, this phenomenon is due to the fact that fast neutrons exhibit a strong tendency to escape at the periphery of the reactor core.

The curve of evolution of heat has substantially the same shape in the case in which the enrichment is the same throughout the reactor core.

It is clearly an advantage to obtain a flatter curve of evolution of heat.

FIG. 2 shows a known method employed precisely for flattening the curve which is representative of the evolution of heat. In this figure, the reactor core is shown diagrammatically in vertical half-section.

The axis Ox represents the distance with respect to the vertical axis Oy of the reactor core. In this embodiment, the central portion of the reactor core a is constituted by fissile material which has a degree of enrichment $E_1$. The central zone a is surrounded by an annular peripheral zone having a thickness b. In this zone, the fissile material has a degree of enrichment $E_2$ which is higher than $E_1$. Finally and in accordance with known practice in breeder reactors, provision is made for a second annulus having a thickness c which constitutes the radial fertile blanket.

There is also shown in this drawing the curve I which gives the neutron flux as a relative value, that is, as a percentage of the maximum flux along the axis of the reactor core.

The full-line curve I just mentioned is a continuous curve.

The higher degree of enrichment within the zone having a thickness b simply has the effect of slowing-down the fall in neutron flux without, however, raising it to any considerable extent. This change is indicated by the point of inflexation A.

The evolution of heat is represented by the broken-line curve II. It is apparent that this non-continuous curve is constituted by three portions. With the scales adopted as ordinates, the first portion $II_a$ follows the curve which gives the neutron flux whereas in the first peripheral zone, the portion of curve $II_b$ is located distinctly above the neutron-flux curve I, this being clearly due to the increased degree of enrichment of the fissile material in this zone. Finally, the third portion $II_c$ corresponds to a very slight evolution of heat within the radial fertile blanket as a result of a very weak enrichment (natural uranium or more generally depleted uranium).

It is thereof readily apparent that this core structure permits a certain flattening of the radial curve of evolution of heat.

Moreover, there was described in U.S. Pat. No. 3,932,217 granted Jan. 13, 1976 to Pierre Charles Cachera and assigned to Electricite de France, a method for achieving enhanced safety of a fast reactor which consists in employing safety fuel elements in which is formed a central passage or axial flow duct of large diameter on the order of 10/15 of the diameter of the fuel element and having a sufficient diameter to ensure that the fuel which may be caused to melt within the central portion of the element under the action of an accidental power excursion is capable of flowing by gravity rapidly into the lower blanket placed as a catchpot without impairing the fuel can. Each safety element has a stack of fissile fuel pellets in the can with each pellet having this axial flow duct and also having a lower member of refractory material with an axial duct at the top of substantially the same diameter as the duct in the fissile portion.

This arrangement makes it possible to ensure enhanced reactor safety since there is obtained at the time of an accidental power excursion of reduction of the quantity of fissile material within the central region of the core in which the neutron flux has the highest intensity, thus resulting in a decrease in reactivity which automatically puts an end to said power excursion.

BRIEF DESCRIPTION OF THE INVENTION

This invention is precisely directed to a method for flattening the curve of evolution of heat within a nuclear reactor core which again makes it possible to retain the method of safety described in the foregoing but also provides advantages of an economic order.

The method adopted for flattening the curve of evolution of heat of fuel elements within the core of a liquid metal cooled fast neutron reactor is distinguished by the fact that the reactor core has at least three regions constituted by vertical fuel elements of constant enrichment and of the same outer diameter, said fuel elements having an axial passage whose diameter decreases from the central region of the core to the periphery at which the neutron flux decreases so as to produce in each section of the fuel an integral of conductivity in the vicinity of the maximum value adopted or in other words to ensure that the temperature at the limit of the central passage is at all points in the vicinity of the maximum temperature adapted for the fuel material (for example 2,250° C. in the case of a mixed $UO_2-PUO_2$ oxide). Thus the wall of said central passage will have in vertical cross-section a profile which corresponds to an isothermal curve. It would therefore be possible to maintain this structure under irradiation since it is known that the fuel tends to be rearranged towards said isothermal internal profile during inpile irradiation.

With reference to the term "integral of conductivity", it is considered as universal (See "$UO_2$ Properties affecting performances" by M. F. Lyons et al., page 8). These terms may be defined in the following manner.

In the fissible material, the thermal conductivity is a function of the temperature $\lambda(T)$.

At the hottest point of the fissile material (the center of the pellet or the edge of the hole), a very high temperature $T_0$ obtains. On the periphery of the pellet, the fissile material, is at its lower temperature $T_1$.

By definition, one calls "integral of conductivity" the integral $$I = - \int_{T_0}^{T_1} \lambda(T)dT$$

wherein T is the temperature within the fissile material.

In a fuel pin, the integral of conductivity is defined only along a line passing through the axis of the pin, said line connecting the center of the pellet (or the edge of the central hole) to the outer edge of the pellet.

The present invention is also concerned with a fast reactor core having at least three regions, said core being essentially constituted by an assembly of vertical fuel elements of constant enrichment and of the same outer diameter, each fuel element having an axial passage of sufficient diameter to permit the flow of molten fissile material, the diameter of each axial passage of the fissile portions of the fuel elements which are located at the center region of the reactor core being larger than that of the fuel elements located in core regions adjacent to the periphery of said reactor core, the diameter of axial passage of all fuel elements which are located at the same distance from the axis of the reactor core being of the same value at the same height.

Moreover, in each fuel element, the diameter of the axial passage progressively decreases from the center of the fuel element to its lower end (as shown in FIG. 3).

The novel method of flattening of the curve of evolution of radial heat is employed with the use of a constant enrichment, thereby securing the advantages of reduction in the void percentage at the periphery, slight reduction in flux at the periphery which in turn has the effect of reducing the neutron flux and therefore of improving the breeding gain, simplification of cheking operations during manufacture of the fuel.

Simplification of inspection and checking during fuel manufacture makes it possible to adopt a reactor core which has at least three fuel zones.

BRIEF DESCRIPTION OF THE DRAWINGS

A more complete understanding of the invention will in any case be obtained from the following description of a number of embodiments of the method which are given by way of example without any limitation being implied, reference being made to the accompanying drawings, in which.

DESCRIPTION OF PREFERRED EMBODIMENTS

As stated earlier, the method consists in forming the nuclear reactor core by means of fuel elements of constant enrichment and of the same outer diameter, the axial canal diameter of at least the central fuel elements being sufficient to permit the flow of molten fissile material. This canal diameter varies, however, according to the position of the fuel element within the reactor core.

In more precise terms, the reactor core comprises at least three sections having fuel elements with different axial diameters, the diameter of the axial passage decreasing from the center to the periphery of the reactor core either in the axial or radial direction, the reduction in diameter being proportional to the reduction in neutron flux density so as to maintain the integral of conductivity at a substantially constant value.

Figure 3:
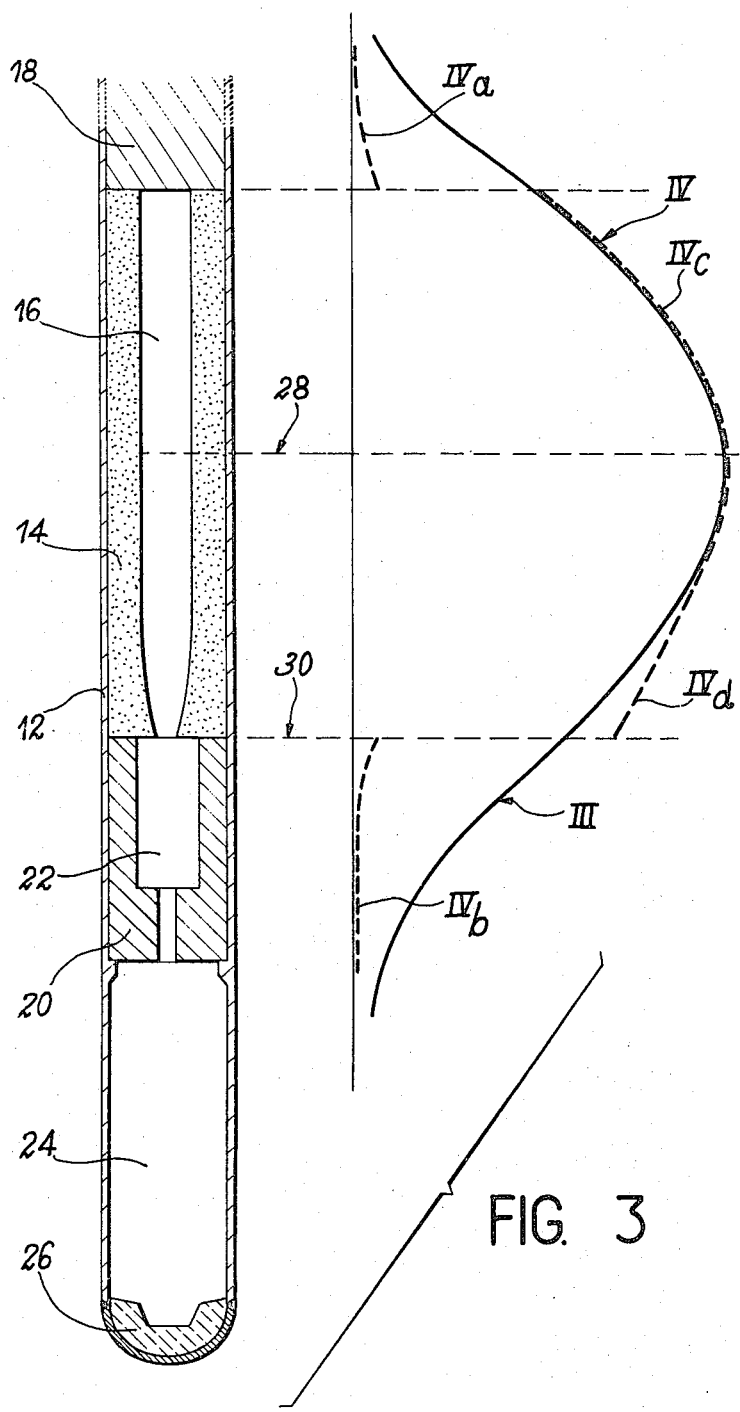
FIG. 3 is a vertical sectional view of a fuel element in accordance with the invention which also shows the curves of neutron flux (III) and of evolution of heat (IV) within said fuel element.

FIG. 3 is a vertical sectional view of a fuel element which is partly identical with that shown in the patent cited earlier.

Said fuel element comprises an external metallic can 12, a portion 14 of fissile material in which is formed a hollow axial passage 16. The fuel element is provided at the top portion thereof with a solid upper blanket 18 and at the bottom portion thereof with a lower blanket 20 which constitutes a first catchpot 22.

Beneath said lower blanket 20, provision is made for a fission-gas expansion chamber 24 and finally for a catchpot 20 of refractory material located at the extreme lower end and designed to form a molten core catchpot which is placed beneath the catchpot 22 and constitutes a "second line of defense".

In accordance with will-known practice, the fissile zone 14 can be formed by a stack of pellets of enriched uranium oxide or of mixed oxide of plutonium and uranium (or thorium). The oxide may be replaced by any other chemical compound of U and Pu which melts freely.

The differences between the fuel element shown in FIG. 3 and the fuel element described in the patent cited in the foregoing (N°3,932,217) lies in the fact that the diameter of the axial passage 16 progressively decreases between the central zone of the fuel assembly represented in the figure by the dashed line 28 and the lower portion of the fissile zone of the fuel element represented by the dashed line 30.

Since the zone 14 is formed by a stack of hollow sintered pellets, the variation in diameter can be achieved in a non-continuous manner at the outset at each change of pellet. The opening formed in the pellets can also be frusto-conical. Any small surface irregularities along the axial passage will in any case tend to disappear during irradiation.

There is shown opposite to the fuel element the continuous curve III which corresponds to the neutron flux in the axial direction of the fuel element, that is, in the axial direction of the reactor core.

For the reasons set forth in the foregoing, the flux curve falls very rapidly towards the upper end and the lower end of the fissile zone of the fuel element to a value of approximately one-half the value attained at the center.

The corresponding evolution of heat is represented by the broken-line curve IV.

Said curve IV is in fact made up of four portions. The portions $IV_a$ and $IV_b$ correspond to the upper and lower blankets of the fuel element. The evolution of heat in these portions is clearly very slight since the enrichment is of small value.

The portion $IV_c$ corresponds to the evolution of heat in the upper half of the fissile zone of the fuel element. Scales can be chosen for this curve so as to ensure that said curve of evolution of heat coincides with the neutron flux curve within said zone.

On the contrary, in the region $IV_d$ which corresponds to the lower half of the fissile zone of the fuel element, it is apparent that the progressive reduction in diameter of the axial passage permits a substantial increase in evolution of heat with respect to that which would have taken place without this modification of the axial passage.

Said variation in diameter of the central passage is calculated so as to ensure that the integral of conductivity is practically retained, which is necessary in order to maintain the maximum temperature of the fuel below a predetermined temperature (2,250° C., for example, in the case of $UO_2-PuO_2$).

When the coolant which usually consists of liquid sodium but can also be gas under pressure flows upwards within the reactor curve, the lifting of core $IV_d$ shown in FIG. 3 is highly advantageous.

It would also be possible to contemplate the symmetrical reduction in diameter of the axial passage when passing from the central region of the fissile zone of the fuel element to the upper end of this latter. Such a modification would assuredly offer an advantage from an economic viewpoint but is not adopted in the preferred embodiment shown in FIG. 3 since this arrangement could give rise to doubtful intrinsic safety of the fuel element in the event of a power excursion which results in partial melt-down of fuel. In point of fact, the fuel which might melt in the upper portion of the fissile zone would be liable to increase the reactivity by flowing zones of higher neutron flux located at the mid-height of the reactor core and thus to reduce the reactivity drop which would be expected as a result of melt-down and of gravitational flow of part of the fuel which is present in the central and bottom zones of the reactor core.

As shown in FIG. 3, the fuel is provided in cross-section with a fissile zone, the lower portion of which is in the form of a nozzle. In the event of a fast power excursion, the temperature and the pressure of the gas located within the central passage 16 increase much faster than the temperature and the pressure of the fission gas which is present within the catchpot 22 and the chamber 24. The gas is thus impelled downwards, with the result that the fall of molten fuel under the action of gravity will be considerably accelerated, particularly at the level of the nozzle.

Figure 4:
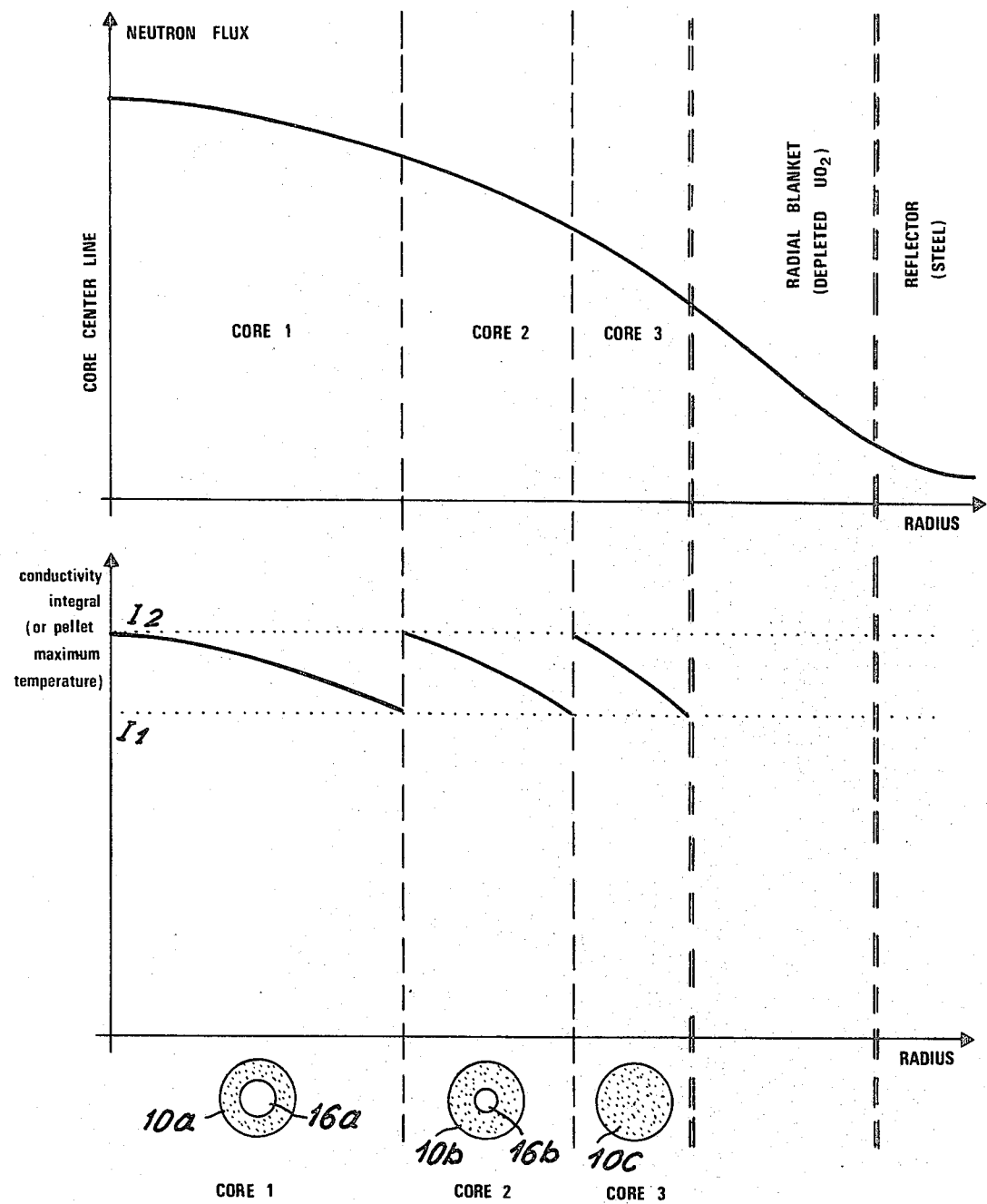
FIG. 4 represents curves which show the neutron flux distribution and the integral of conductivity in each section of the pellets as a function of the distance from the axis of the reactor core, the latter having three regions formed of hollow fuel elements having three different canal diameters according to the teachings of the invention.

FIG. 4 shows how the provision of three core regions formed of fuel elements having different canal diameter allows a flattening of the curve of evolution of heat by maintaining the integral of conductivity at a substantially constant value.

Figure 1:
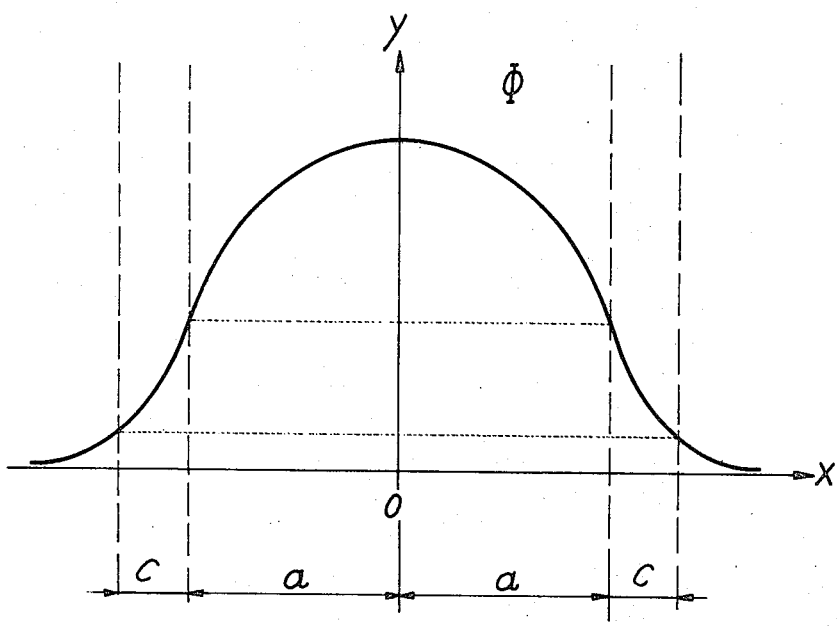
FIG. 1 represents a curve (already described in the foregoing) which shows the neutron flux distribution as a function of the distance from the axis of the reactor core.
Figure 2:
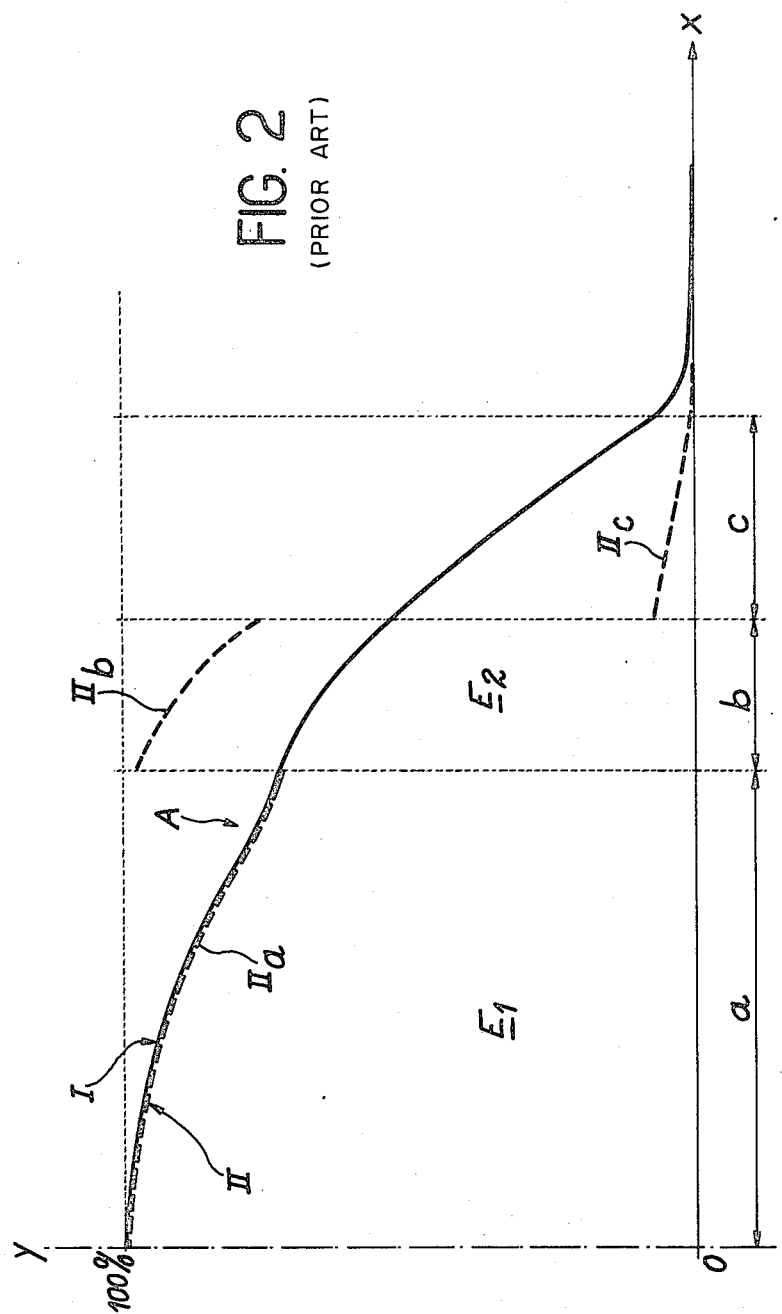
FIG. 2 represents a curve (already described in the foregoing) which shows the neutron flux distribution and the distribution of heat evolution within the core of a nuclear reactor having a number of degrees of enrichment.

More precisely, the upper curve of FIG. 4 represents on a different scale the curve of FIG. 1 illustrating the neutron flux distribution as a function of the distance from the axis or center line of the reactor core, when the enrichment of the fuel elements is constant throughout the reactor core.

Moreover, it is shown at the lower portion of FIG. 4 that the reactor core is formed of three regions, called core 1, core 2 and core 3, located concentrically relative to the center line of the core, the fuel elements of each regions having the same outer diameter, whereas the fuel elements 10a of the center region (core 1) have an axial passage or canal 16a of a greater diameter than the fuel elements 10b of the middle region (core 2), the latter elements 10b having an axial passage or canal 16b of a greater diameter than the fuel elements 10c of the outer region (core 3). In the described embodiment, the fuel elements 10c are even shown as solid elements having no axial passage. All the fuel elements of each core region are identical.

The lower curve of FIG. 4 shows that the diameter of the passages of the fuel elements in each core region are not chosen at random. On the contrary, and according to the teachings of the invention, the reduction in diameter of the passages from the center region (core 1) until the outer region (core 3) is proportional to the reduction in the neutron flux density. Thanks to this specific distribution, FIG. 4 shows that the integral of conductivity at a given height in the core in the radial direction is maintained between two relatively close values $I_1$ and $I_2$. In other words, the integral of conductivity is maintained at a substantially constant value, which can be chosen as the maximum value adopted, thereby improving the economic characteristics of the reactor core.

Although three core regions have been described it will be understood that the core can be divided in four or more core regions without departing from the scope of the invention.

It is known that, in respect of equal power density in the fuel, the adoption of hollow fuel results in a reactor core of greater bulk and in higher neutron leakages.

The slight overenrichment and the resultant drop in breeding gain was the disadvantage attached to the fuel described in the patent cited earlier.

The type of fuel described in the present patent specification makes it possible to achieve a considerable reduction of neutron leakages, firstly by reducing the void percentage within the reactor core and especially at the periphery of this latter but also because the peripheral elements have no increased enrichment and by accepting within this zone a steeper downward flux curve and therefore a slightly lower value of neutron flux at the level of and across the surface which separates the reactor core from the lateral blankets.

Furthermore, even if only the fuels which are located within the internal zone of the reactor core retain a central passage of sufficient diameter to permit flow of the molten fuel under the action of gravity, the safety claimed in the patent cited above is still ensured. The reason for this is that the counter-reaction to power excursion has a particularly marked effect in the case of fuels located at the center, at which the molten fuel flows from a zone of maximum neutron flux.

Furthermore, at the time of a very fast power excursion, the melt-down process will begin with the central fuels. Let it be assumed that the same integral of conductivity has been retained at the mid-height of the reactor core, both at the center and at the periphery. The same maximum fuel temperature will then exist at all points (for example 2,250° C., namely a margin of 500° C. with respect to the melting point of the $UO_2$—$PuO_2$ mixture which is estimated at 2,750° C.).

At the time of the power excursion, the value of neutron flux at the center will remain at each moment as at the outset approximately twice the value at the periphery. In consequence, the margin which is assumed by way of example to have the value of 500° C. will be absorbed twice as quickly at the center as at the periphery.

Thus, even in the case of a normal operating regime which is as "isothermal" as possible, the central passages of largest diameter must in fact be located at the center of the reactor core at which the melt-down process will begin in order to facilitate the discharge of molten fissile material.

What I claim is:

1. A method for flattening the curve of evolution of heat of vertical fuel elements within the core of a liquid metal cooled fast neutron reactor having at least three core regions in which the density of neutron flux in the reactor conventionally decreases when going from the center of the core of the reactor toward its periphery in an axial direction and in a radial direction comprising the steps of forming said at least three core regions of hollow vertical fuel elements of constant enrichment and of the same outer diameter, of a material which is entirely in a solid state at the normal temperature of functioning of said reactor, forming each fuel element with an axial vertical canal in the fissile part of the fuel element having a diameter in right section, disposing said elements in the core in such a way that the elements at the center of the core have a greater canal diameter than the elements disposed closer the radial periphery of the core, the diameter in right section of the axial canal of the fuel elements in each core region being different from the diameters at the same height in all other core regions with this reduction in diameter being proportional to the reduction in neutron flux density so as to maintain the integral of conductivity at a substantially constant value, and providing for the fuel elements disposed at the same radial distance from the center of the core the same diameter of axial canal.

2. A fast reactor core comprising at least three core regions, a plurality of vertical fuel elements of constant enrichment and of the same outer diameter distributed throughout said at least three core regions, said fuel elements being constituted by a material which is entirely in a solid state at the normal temperature of functioning of the reactor, said core having a center and a radial periphery, the density of neutron flux conventionally decreasing from the center of the core towards its periphery along vertical and radial directions, an axial canal in each of the fissile portions of said fuel elements, said fuel elements at the center region of a core having an axial canal the diameter of which in right section is greater than that of the fuel elements in core regions closer to the radial periphery of the core, the diameter in right section of the axial canal of the fuel elements in each core region being different from the diameters at the same height in all other core regions with this decrease of diameter at the same height in the core in the radial direction being proportionate to the decrease of the density of neutron flux along the radial direction and the fuel elements disposed at the same radial distance from the center of the core having the same diameter of axial canal.

3. A method according to claim 1 including the step for a given fuel element of reducing the diameter of said axial passage from the mid-height thereof to the lower end of the fissile zone of said fuel element, the diameter of said axial passage between the mid-height and the top end being maintained substantially equal to the diameter of said axial passage at the mid-height.

4. A reactor core according to claim 2 including for a given fuel element a diameter of said axial passage progressively decreasing from the mid-height of the fuel element to the lower end thereof, the diameter of said axial passage between the mid-height and the top end being maintained substantially equal to the diameter of said axial passage at the mid-height.

* * * * *